(12) United States Patent
Rhoden

(10) Patent No.: US 10,502,159 B2
(45) Date of Patent: Dec. 10, 2019

(54) ELECTRIC BOOST ACTUATION SYSTEM FOR TRANSLATING RINGS

(71) Applicant: Hamilton Sundstrand Corporation, Charlotte, NC (US)

(72) Inventor: William E. Rhoden, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 870 days.

(21) Appl. No.: 14/503,892

(22) Filed: Oct. 1, 2014

(65) Prior Publication Data

US 2016/0097346 A1   Apr. 7, 2016

(51) Int. Cl.
| | |
|---|---|
| *F02K 1/18* | (2006.01) |
| *F02K 1/06* | (2006.01) |
| *F02K 1/09* | (2006.01) |
| *F02K 1/15* | (2006.01) |
| *F02K 1/76* | (2006.01) |
| *F16H 25/22* | (2006.01) |

(52) U.S. Cl.
CPC .................. *F02K 1/18* (2013.01); *F02K 1/06* (2013.01); *F02K 1/09* (2013.01); *F02K 1/15* (2013.01); *F02K 1/763* (2013.01); *F16H 25/2204* (2013.01); *F05D 2250/34* (2013.01); *F05D 2260/406* (2013.01); *F05D 2260/407* (2013.01); *F05D 2260/57* (2013.01)

(58) Field of Classification Search
CPC ..... F02K 1/06; F02K 1/09; F02K 1/15; F02K 1/18
See application file for complete search history.

(56) References Cited

U.S. PATENT DOCUMENTS

| | | | | |
|---|---|---|---|---|
| 8,505,307 | B2* | 8/2013 | Wang | F02K 1/09 |
| | | | | 239/265.25 |
| 8,978,356 | B2* | 3/2015 | Burgess | F02K 1/06 |
| | | | | 60/226.2 |
| 9,488,130 | B2* | 11/2016 | Chakkera | F02K 1/72 |
| 2004/0075020 | A1 | 4/2004 | Trikha | |

(Continued)

FOREIGN PATENT DOCUMENTS

| | | |
|---|---|---|
| WO | WO0005497 A1 | 2/2000 |
| WO | WO2009029401 A2 | 3/2009 |

OTHER PUBLICATIONS

Cavcar, Mustafa, "Load Factor and Maneuvering", 2004, pp. 1-4.*
Extended European Search Report for European Application No. 15187583.8, dated Feb. 25, 2016, 9 pages.

*Primary Examiner* — Steven M Sutherland
*Assistant Examiner* — Thuyhang N Nguyen
(74) *Attorney, Agent, or Firm* — Kinney & Lange, P.A.

(57) ABSTRACT

An actuation system for a gas turbine engine oriented about a centerline includes a translating ring, at least one hydraulic actuator, and at least one electric actuator. The translating ring is oriented about the centerline and configured to move axially along the centerline. The at least one hydraulic actuator is configured to provide a first mechanical force to move the translating ring along the centerline. The at least one electric actuator is configured to provide a second mechanical force to move the translating ring in the axial direction. The at least one electric actuator is controlled to provide the second mechanical force upon determination of an operating condition.

15 Claims, 3 Drawing Sheets

(56) References Cited

U.S. PATENT DOCUMENTS

| | | |
|---|---|---|
| 2010/0116929 A1 | 5/2010 | Hejda |
| 2012/0137654 A1* | 6/2012 | Burgess ............... F02K 1/06 |
| | | 60/204 |
| 2013/0312387 A1 | 11/2013 | West et al. |
| 2014/0145525 A1* | 5/2014 | Dooley ............... H02K 1/278 |
| | | 310/51 |

* cited by examiner

ELECTRIC BOOST ACTUATION SYSTEM
FOR TRANSLATING RINGS

BACKGROUND

The present invention relates generally to aircraft translating rings, and in particular to electric boost actuation systems for translating rings.

Aircraft engines, such as gas turbine engines, include translating rings that control, for example, engine nozzles. The translating ring is actuated axially along the engine's centerline in order to open/close the nozzle. This axial movement is often controlled through the use of hydraulic actuation systems. Large gas turbine engines may experience g-loading during flight that temporarily increases the translating ring's resistance to movement. This resistance to movement may create timeframes in which the existing hydraulic actuation systems are unable to provide a great enough force to actuate the translating ring. It is desirable to create a system to accommodate extra g-loading during flight without the addition of further hydraulic actuators.

SUMMARY

An actuation system for a gas turbine engine oriented about a centerline includes a translating ring, at least one hydraulic actuator, and at least one electric actuator. The translating ring is oriented about the centerline and configured to move axially along the centerline. The at least one hydraulic actuator is configured to provide a first mechanical force to move the translating ring along the centerline. The at least one electric actuator is configured to provide a second mechanical force to move the translating ring in the axial direction. The at least one electric actuator is controlled to provide the second mechanical force upon determination of an operating condition.

A method of actuating a translating ring of a gas turbine engine includes applying a first force, using at least one hydraulic actuator, to translate the ring in an axial direction, sampling, using a controller, at least one sensed engine condition, determining, using the controller, an operating condition of the gas turbine engine based upon the at least one sensed engine condition, and applying a second force, using at least one electric actuator, to translate the ring in the axial direction based upon the operating condition of the gas turbine engine.

DETAILED DESCRIPTION

Disclosed herein is a system and method for providing electric boost actuation for translating rings of gas turbine engines. The electric boost actuation system includes a plurality of hydraulic actuators and at least one electric actuator such as, for example, an electromechanical actuator and/or a piezoelectric actuator. The electric actuator may be positioned along the ring at a position selected to have the greatest chance of binding under g-loads. The electric actuator may be powered by a permanent magnet actuator (PMA) onboard the engine using twenty-eight volt direct current (DC) or two hundred seventy volt DC power, for example. A controller may issue software commands to control the electric actuator to apply additional force as a function of, for example, g-loading, air loads on engine components, and/or hydraulic actuator position.

Figure 1:
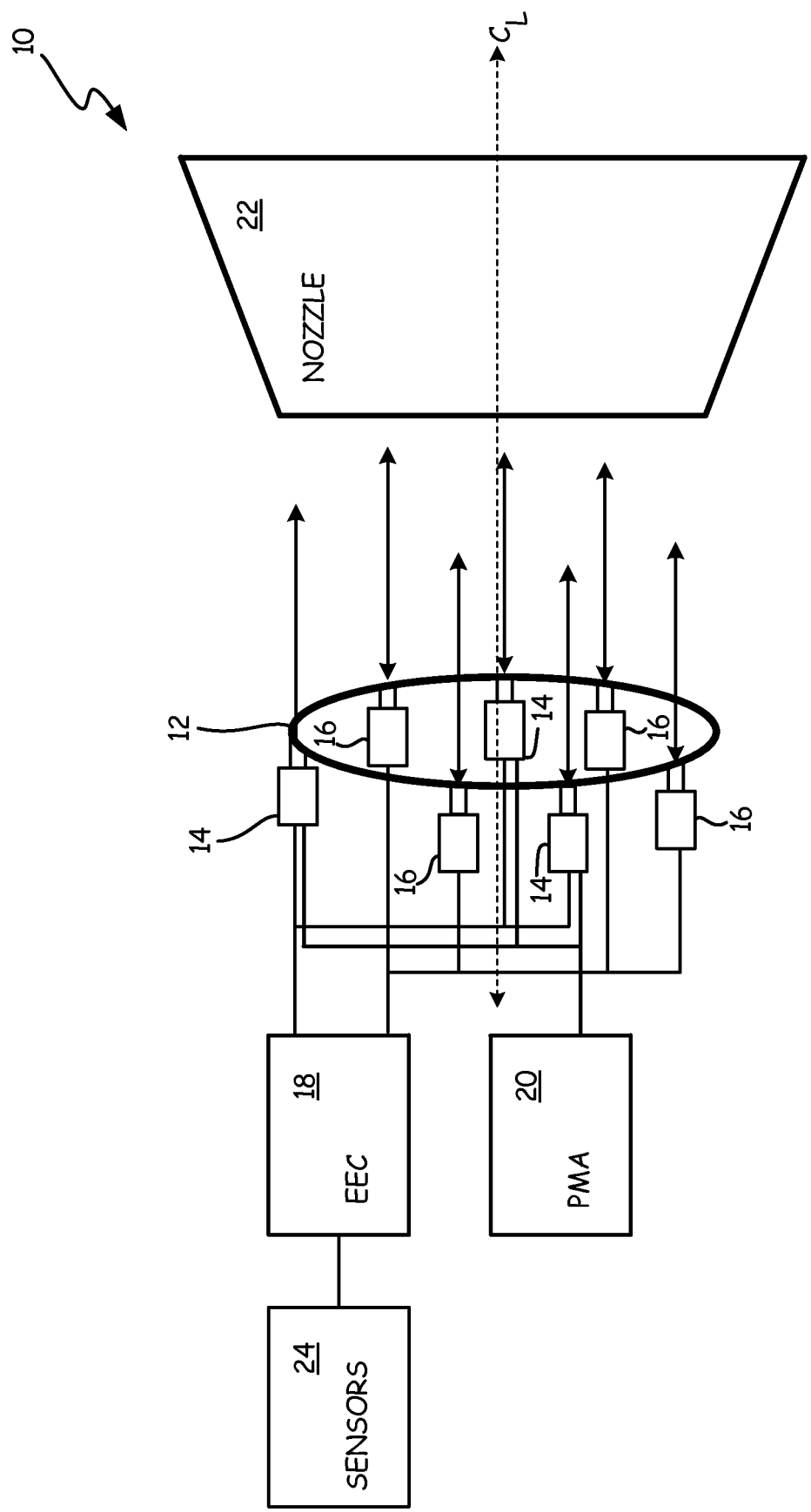
FIG. 1 is a block diagram illustrating an electric boost actuation system for actuating a translating ring of a gas turbine engine.

FIG. 1 is a block diagram illustrating electric boost actuation system 10 for actuating translating ring 12 of, for example, a gas turbine engine. System 10 includes translating ring 12, electric actuators 14, hydraulic actuators 16, controller 18, power source 20, nozzle 22, and aircraft sensors 24. Although illustrated as a permanent magnet alternator in FIG. 1, power source 20 may be implemented as any source of power for electric actuators 14. Aircraft sensors 24 are any sensors onboard an aircraft or gas turbine engine that measure flight conditions such as air speed, altitude, and/or any other flight conditions. Gas turbine engine is oriented about a centerline ($C_L$).

Translating ring 12 moves axially along the centerline ($C_L$) of the engine to adjust the area of nozzle 22. The size of the aperture of nozzle 22 is controlled based upon the axial position of translating ring 12. The size of the aperture is adjusted to control, for example, the thrust of the gas turbine engine. In past systems, for example, only hydraulic actuators were utilized to move translating ring 12 approximately four inches. The amount of force provided by these hydraulic actuators did not provide for any extra force beyond that needed to translate the ring at minimal g-loading.

During flight, if the aircraft is, for example, pulling out of a dive, the aircraft may experience significant g-loading such as four or five gravitational units. This extra loading can create increased friction and resistance to motion for translating ring 12. Test data has shown that force augmentation of approximately one thousand pound-forces (lbfs) is sufficient for the first half of the hydraulic actuator stroke for this extra loading. For example, hydraulic actuators 16 may provide a full stroke of four inches when applying force to translating ring 16. The extra force augmentation may only be needed, for example, during the first two inches of the full four-inch stroke of hydraulic actuators 16. Other forces may be more appropriate for other embodiments.

Electric actuators 14 are implemented to accommodate the extra force needed to overcome the resistances and frictions created by significant g-loading during flight. Any number of electric actuators 14 may be implemented about translating ring 12 to provide the necessary force, such as one thousand lbfs, to translate ring 12 during times of significant g-loading. The location of electric actuators 14 in relation to translating ring 12 may be selected based upon, for example, the most likely locations of binding along ring 12.

Controller 18 may provide software commands to operate both electric actuators 14 as well as hydraulic actuators 16. Controller 18 may be, for example, an electric engine controller (EEC). Hydraulic actuators 16 may include, for example, a current drive which may be a servo motor that controls operation of the hydraulic actuator. During moments of increased resistance or friction for translating ring 12, the current to the servo motors of hydraulic actuators 16 may increase. Controller 18 may monitor the current to the servo motors to determine if extra force from electric actuators 14 is needed. Controller 18 may also monitor aircraft sensors 24 to determine, for example, g-loading, air loads, or other flight conditions. Thus, electric actuators 14 may be operated by controller 18 only when needed based upon determination by controller 18.

Figure 2A:
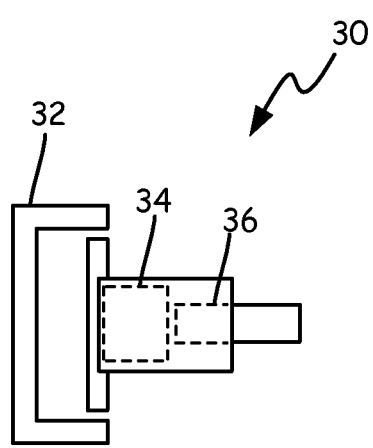
FIG. 2A is a diagram illustrating an electromechanical actuator for an electric boost actuation system.

With continued reference to FIG. 1, FIG. 2A is a diagram illustrating electromechanical actuator 30 for electric boost actuation system 10. In the embodiment illustrated in FIG. 2A, electromechanical actuator 30 is utilized as electric actuator 14 for system 10. Electromechanical actuator 30 includes base 32, motor 34, and ball screw 36. Although illustrated with motor 34 and ball screw 36, electromechanical actuator 30 may be implemented as any electrically powered electromechanical actuator. Ball screw 36 may, for example, be implemented to extend one-half the stroke length of hydraulic actuators 16. This may be done in systems in which the extra force from electromechanical actuator 30 is only needed for a first portion of the stroke of hydraulic actuators 16 under extra loading.

The end of ball screw 36 may be connected to translating ring 12. Electromechanical actuator 30 may be implemented, for example, such that actuator 30 remains in base 32 for the first half-stroke of hydraulic actuators 16. Motor 34 receives power from power source 20 and commands from controller 18. Based upon the commands from controller 18, motor 34 translates ball screw 36 to apply force to translating ring 12 in the axial direction. At, for example, the first half stroke of hydraulic actuators 16, ball screw 36 reaches its maximum extended position. Following this first half-stroke, electromechanical actuator 30 moves axially away from base 32, no longer applying force to translating ring 12. As hydraulic actuators 16 retract, electromechanical actuator 30 will return to base 32, and ball screw 34 will retract.

Figure 2B:
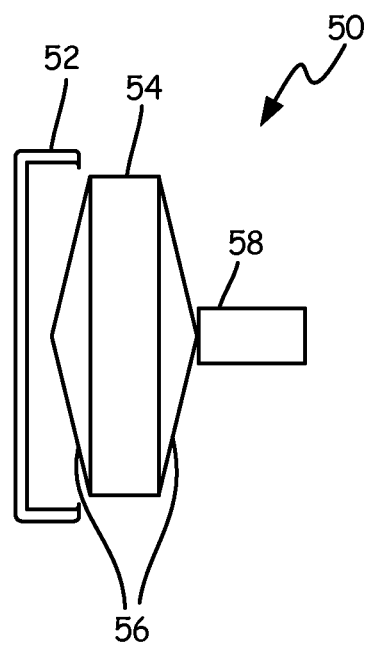
FIG. 2B is a diagram illustrating a piezoelectric actuator for an electric boost actuation system.

With continued reference to FIG. 1, FIG. 2B is a diagram illustrating piezoelectric actuator 50 for electric boost actuation system 10. In the embodiment illustrated in FIG. 2B, piezoelectric actuator 50 is utilized as electric actuator 14 for system 10. Piezoelectric actuator 50 includes base 52, piezo stack 54, springs 56, and piston 58. Piezo stack 54 may comprise one or more piezoelectric devices such as, for example, piezoelectric crystals. Any number of piezoelectric devices may be implemented to satisfy the needs of the specific application. When a voltage is applied across a piezoelectric device, the device may expand or compress, depending upon the polarity of the signal. This compression may be on the order of, for example, thousandths of an inch. Springs 56 may be implemented to amplify the reaction of the compression of piezo stack 54. For example, as piezo stack 54 compresses, springs 56 may extend outward to extend piston 58 in the axial direction. The extension of piston 58 may be configured such that it is, for example, one-half of the stroke of hydraulic actuators 16. This may be done in systems in which the extra force from piezoelectric actuators 50 is only needed for a first portion of the stroke of hydraulic actuators 16 under extra loading.

The end of piston 58 may be connected to translating ring 12. Piezoelectric actuator 50 may be implemented, for example, such that actuator 50 remains in base 52 for the first half-stroke of hydraulic actuators 16. Piezo stack 54 receives a voltage from power source 20 that may be controlled based upon commands from controller 18. Based upon these commands, the voltage compresses piezo stack 54, which expands springs 56 outwardly to apply force to translating ring 12 in the axial direction through piston 58. At, for example, the first half stroke of hydraulic actuators 16, piston 58 reaches its maximum extended position. Following this first half-stroke, piezoelectric actuator 50 moves axially away from base 52, no longer applying force to translating ring 12. As hydraulic actuators 16 retract, piezoelectric actuator 50 will return to base 52, and piezo stack 54 will expand to its original state.

Figure 3:
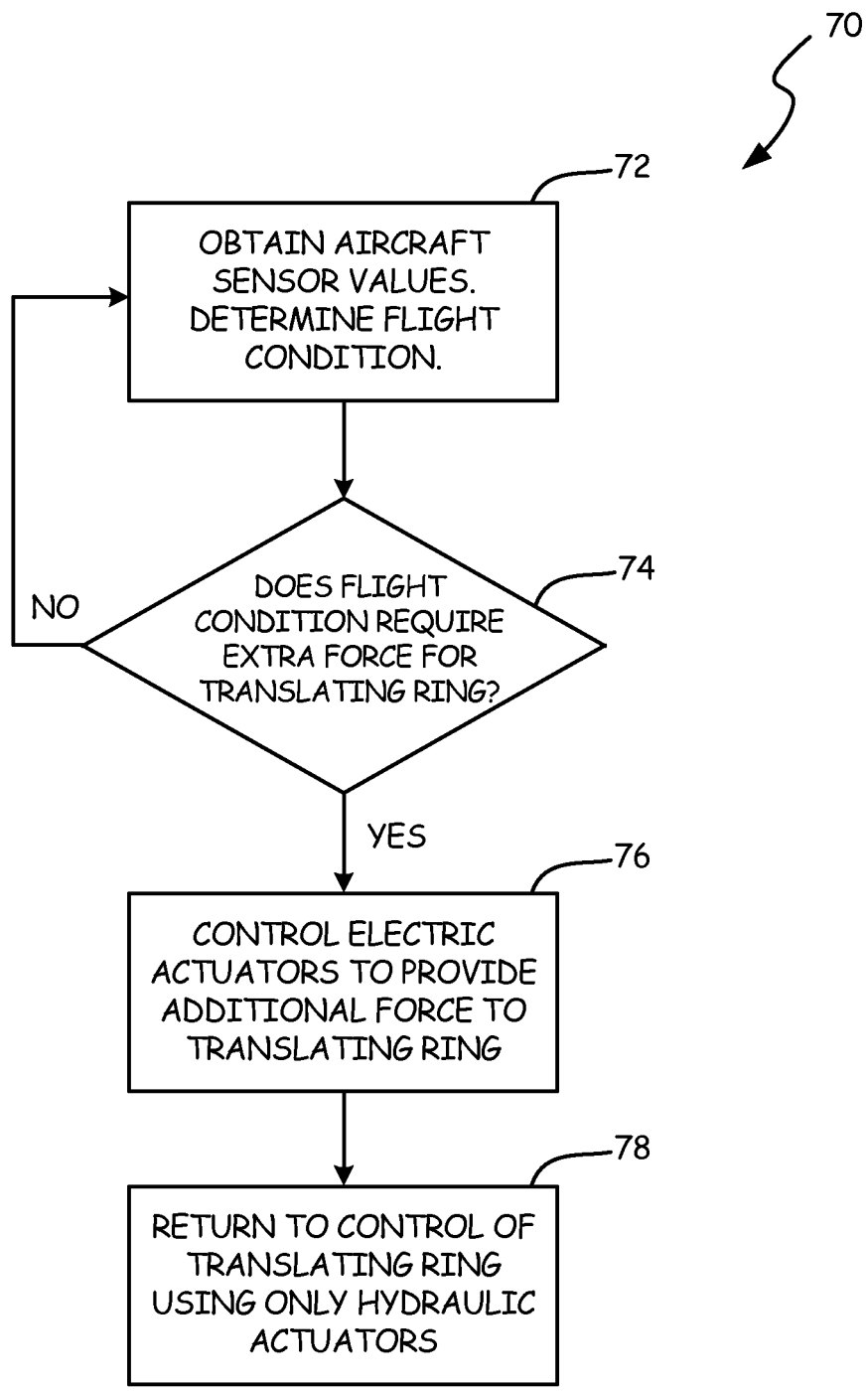
FIG. 3 is a flowchart illustrating a method for actuating a translating ring of a gas turbine engine utilizing an electric boost actuation system.

With continued reference to FIG. 1, FIG. 3 is a flowchart illustrating method 70 for actuating translating ring 12 of a gas turbine engine utilizing electric boost actuation system 10. At step 72, controller 18 obtains sensed values from aircraft sensors 24. Controller 18 may also sample the currents provided to hydraulic actuators 16 to determine if translating ring 12 is experiencing any friction or resistance. At step 74, if controller 18 determines that the aircraft is in a high g-loading condition and/or translating ring is experiences resistance or friction, method 70 proceeds to step 76. Otherwise, method 70 returns to step 72 and continues to monitor aircraft conditions. At step 76, upon need for movement of translating ring 12, controller 18 issues commands to electric actuators 14 to apply an extra force to move translating ring 12. At step 78, following initial application of extra force from electric actuators 14, controller 18 returns to controlling just hydraulic actuators 16 to control movement of translating ring 12.

DISCUSSION OF POSSIBLE EMBODIMENTS

The following are non-exclusive descriptions of possible embodiments of the present invention.

An actuation system for a gas turbine engine oriented about a centerline includes a translating ring, at least one hydraulic actuator, and at least one electric actuator. The translating ring is oriented about the centerline and configured to move axially along the centerline. The at least one hydraulic actuator is configured to provide a first mechanical force to move the translating ring along the centerline. The at least one electric actuator is configured to provide a second mechanical force to move the translating ring in the axial direction. The at least one electric actuator is controlled to provide the second mechanical force upon determination of an operating condition.

The actuation system of the preceding paragraph can optionally include, additionally and/or alternatively, any one or more of the following features, configurations and/or additional components:

A further embodiment of the foregoing actuation system, wherein the translating ring is configured to adjust a nozzle of the gas turbine engine.

A further embodiment of any of the foregoing actuation systems, wherein the at least one electric actuator is an electromechanical actuator comprising a motor and a ball screw.

A further embodiment of any of the foregoing actuation systems, wherein the motor is powered by a permanent magnet alternator of the gas turbine engine, and wherein the motor translates the ball screw to apply the second mechanical force to the translating ring.

A further embodiment of any of the foregoing actuation systems, wherein the at least one electric actuator has a stroke length of one-half a length of a stroke of the at least one hydraulic actuator.

A further embodiment of any of the foregoing actuation systems, wherein the at least one electric actuator is a piezoelectric actuator.

A further embodiment of any of the foregoing actuation systems, wherein the piezoelectric actuator includes a piezo stack configured to receive a voltage from the controller, at least one spring configured to expand as the piezo stack expands or compresses in response to the voltage from the controller, and a piston configured to exert the second mechanical force on the translating ring as the at least one spring expands.

A further embodiment of any of the foregoing actuation systems, wherein the operating condition is g-loading of the gas turbine engine.

A method of actuating a translating ring of a gas turbine engine includes applying a first force, using at least one hydraulic actuator, to translate the ring in an axial direction, sampling, using a controller, at least one sensed engine condition, determining, using the controller, an operating condition of the gas turbine engine based upon the at least one sensed engine condition, and applying a second force, using at least one electric actuator, to translate the ring in the axial direction based upon the operating condition of the gas turbine engine.

The method of the preceding paragraph can optionally include, additionally and/or alternatively, any one or more of the following features, configurations and/or additional components:

A further embodiment of the foregoing method, wherein applying the second force, using the at least one electric actuator, comprises applying the second force, using at least one electromechanical actuator, to translate the ring in the axial direction.

A further embodiment of any of the foregoing methods, wherein the applying the second force, using the at least one electromechanical actuator includes powering, using a permanent magnet alternator, a motor of the electromechanical actuator; translating, using the motor, a ball screw of the electromechanical actuator; and applying the second force, using the ball screw.

A further embodiment of any of the foregoing methods, wherein applying the second force, using the at least one electric actuator, comprises applying the second force, using at least one piezoelectric actuator, to translate the ring in the axial direction.

A further embodiment of any of the foregoing methods, wherein applying the second force, using the at least one piezoelectric actuator includes powering, using a permanent magnet alternator, the piezoelectric actuator; controlling, using the controller, a voltage applied to a piezo stack of the piezoelectric actuator; translating a piston of the piezoelectric actuator based upon compression or expansion of the piezo stack; and applying the second force to the translating ring using the piston.

A further embodiment of any of the foregoing methods, wherein sampling, using the engine controller, the at least one sensed engine condition comprises monitoring current to the at least one hydraulic actuator.

A further embodiment of any of the foregoing methods, wherein determining, using the controller, an operating condition comprises determining, using the controller, g-loading of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuation system for a gas turbine engine oriented about a centerline, the actuation system comprising:
   a translating ring oriented about the centerline and configured to move axially along the centerline;
   at least one hydraulic actuator configured to provide a first mechanical force at a first location about the translating ring to axially move the translating ring along the centerline; and
   at least one electric actuator physically separate from the at least one hydraulic actuator and configured to provide a second mechanical force at a second location about the translating ring to axially move the translating ring, wherein the at least one electric actuator is controlled to provide the second mechanical force upon determination of an operating condition and wherein the first location and the second location are spaced apart by a distance along a circumference of the translating ring, and at a common axial location along the centerline.

2. The actuation system of claim 1, wherein the translating ring is configured to adjust a nozzle of the gas turbine engine.

3. The actuation system of claim 1, wherein the at least one electric actuator is an electromechanical actuator comprising a motor and a ball screw.

4. The actuation system of claim 3, wherein the motor is powered by a permanent magnet alternator of the gas turbine engine, and wherein the motor translates the ball screw to apply the second mechanical force to the translating ring.

5. The actuation system of claim 1, wherein the at least one electric actuator has a stroke length of one-half a length of a stroke of the at least one hydraulic actuator.

6. The actuation system of claim 1, wherein the at least one electric actuator is a piezoelectric actuator.

7. The actuation system of claim 6, wherein the piezoelectric actuator comprises: a piezo stack configured to receive a voltage from a controller; at least one spring configured to expand as the piezo stack expands or compresses in response to the voltage from the controller; and a piston configured to exert the second mechanical force on the translating ring as the at least one spring expands.

8. The actuation system of claim 1, wherein the operating condition is g-loading of the gas turbine engine.

9. A method of actuating a translating ring of a gas turbine engine, wherein the translating ring is oriented about a centerline, the method comprising:
   applying a first mechanical force at a first location about the translating ring, using at least one hydraulic actuator, to translate the ring in an axial direction;
   sampling, using a controller, at least one sensed engine condition;
   determining, using the controller, an operating condition of the gas turbine engine based upon the at least one sensed engine condition; and
   applying a second mechanical force at a second location about the translating ring, using at least one electric actuator physically separate and circumferentially offset from the at least one hydraulic actuator about the centerline, to translate the ring in the axial direction based upon the operating condition of the gas turbine engine and wherein the first location and the second location are spaced apart by a distance along a circumference of the translating ring and at a common axial location along the centerline.

10. The method of claim 9, wherein applying the second mechanical force, using the at least one electric actuator, comprises applying the second mechanical force, using at least one electromechanical actuator, to translate the ring in the axial direction.

11. The method of claim 10, wherein the applying the second mechanical force, using the at least one electromechanical actuator comprises:
   powering, using a permanent magnet alternator, a motor of the electromechanical actuator;
   translating, using the motor, a ball screw of the electromechanical actuator; and
   applying the second mechanical force, using the ball screw.

12. The method of claim 9, wherein applying the second mechanical force, using the at least one electric actuator, comprises applying the second mechanical force, using at least one piezoelectric actuator, to translate the ring in the axial direction.

13. The method of claim 12, wherein applying the second mechanical force, using the at least one piezoelectric actuator comprises:
   powering, using a permanent magnet alternator, the piezoelectric actuator;
   controlling, using the controller, a voltage applied to a piezo stack of the piezoelectric actuator;
   translating a piston of the piezoelectric actuator based upon compression or expansion of the piezo stack; and
   applying the second mechanical force to the translating ring using the piston.

14. The method of claim 9, wherein sampling, using the controller, the at least one sensed engine condition comprises monitoring current to a current drive configured to control operation of the at least one hydraulic actuator.

15. The method of claim 9, wherein determining, using the controller, an operating condition comprises determining, using the controller, g-loading of the gas turbine engine.

* * * * *